United States Patent [19]

Kalen et al.

[11] Patent Number: 5,178,648

[45] Date of Patent: Jan. 12, 1993

[54] PARTICULATE FILTRATION APPARATUS AND METHOD

[75] Inventors: Bodo Kalen, Huntington Bay; Nicholas L. Giuricich, Dix Hills, both of N.Y.

[73] Assignee: Emtrol Corporation, Hauppauge, N.Y.

[21] Appl. No.: 727,995

[22] Filed: Jul. 10, 1991

[51] Int. Cl.$^5$ .............................. B01D 45/12
[52] U.S. Cl. ........................... 55/1; 55/349; 55/459.1
[58] Field of Search ............ 55/267, 349, 459.1, 55/346-348, 1

[56] References Cited

U.S. PATENT DOCUMENTS

| | | | |
|---|---|---|---|
| 2,583,921 | 1/1952 | Yellott | 55/348 |
| 3,415,042 | 12/1968 | Wilson | 55/348 |
| 4,348,215 | 9/1982 | Dehne | 55/349 |
| 4,398,932 | 8/1983 | Dehne | 55/267 |
| 4,687,497 | 8/1987 | Owen et al. | 55/349 |

Primary Examiner—Bernard Nozick
Attorney, Agent, or Firm—Robbins & Robbins

[57] ABSTRACT

A method and apparatus are provided for separating particulate material from hot gas. Provisions are made for accommodating relative thermal expansion between a hot particular laden gas chamber, a particulate discharge chamber and a clean gas chamber. A main housing supports an interior subhousing supported from the top of the main housing while a further discharge chamber housing is supported from a lower part of the subhousing in such a manner that they are free to expand and contract independently of one another. Gas and particulate separators which are free from load bearing stresses are designed to receive the particulate laden gas and pass particulates to the particulate discharge chamber for bottom discharge and the gas to the clean gas chamber for discharge at the top of the main housing. Provisions are made for auxiliary discharge of particulates bypassing the separators at a bottom of the clean gas chamber. Relative expansion is provided for at the lower extremities of the main housing and subhousing and discharge chamber housing with gas sealing therebetween. Downward flow of the particulate laden hot gas past the separators is employed to drive the particulates in a direct line to minimize dissipating energy in peripheral or vortical flow.

24 Claims, 2 Drawing Sheets

PARTICULATE FILTRATION APPARATUS AND METHOD

RELATED APPLICATION

This application is copending with applicants' application Ser. No. 640,022, filed Jan. 11, 1991, now U.S. Pat. No. 5,122,171, granted Jun. 16, 1992.

BACKGROUND OF THE INVENTION

This invention relates to a method and apparatus for separating particulate material from hot gas, commonly known as a cyclone separator system.

With the gradual advent of extremely demanding legislation for protection of the atmosphere, the field of particle separation from gases has acquired a very high priority, and there has been an ever-increasing need for improved efficiency and durability of the separating equipment, and particularly for separating out more and more of the finer particles.

In the past the prevailing approach has been to feed the particulate laden hot gas radially into a cylindrical barrel so as to cause a vortical flow of the gas and particles. As shown in the present disclosure, it has now been recognized that the energy imparted to the particles prior to arrival at the inlet of the system can be better utilized by dispensing with the vortical flow and projecting the particles directly toward the system outlet so that, by virtue of this momentum, a very substantial portion of the particles will be carried beyond the separators and thus separated in a different way from the gas in which it has been entrained.

This concept of direct separation introduces new complexity into the already severe challenge of dealing with special heat expansion problems characteristic of cyclone separation systems as a class. A wide variety of temperature conditions are encountered from startup to normal operating temperatures, including short term over-temperature excursions of several hundred degrees Fahrenheit. These severe temperature changes can result in rather extensive movement of individual parts. In addition to the thermal load, the particulate laden gas is introduced under pressure, and one must also take into account vessel pressure and another form commonly known as "collapsing pressure" due to pressure loss through the cyclone system.

In addition, from time to time special pressure-temperature-velocity conditions may arise which set up violent oscillation of heavier parts. If very special measures are not taken to compensate for these destructive forces, they will quickly take a toll on the efficiency and useful life of the entire structure.

The present invention takes these needs into account in a very special way.

SUMMARY OF THE INVENTION

By means of this invention there has been provided a method and apparatus for separating particulates and clean gas from a hot particulate laden gas with improved separation efficiency and provision for minimizing stresses encountered by differential thermal expansion between the various parts of the apparatus.

In the method and apparatus of the invention the particulate laden gas is introduced at the top of a main housing and passed directly or axially past separators where a portion of the particulate laden gas is introduced for separation into particulates and clean gas. The clean gas when separated from the particulate laden gas may be directed upwardly, or axially, in counter-current relation with the hot particulate laden gas and exhausted at the top of the apparatus while separated particulates are removed from the bottom of the apparatus.

By passing the particulate laden gas downward directly past the separators, a further portion of the energy supplied by the particulate laden hot gas drives a substantial portion of the particulates in a direct line to a sealed portion of the bottom of the apparatus where they can be removed independently from the particulates separated by the separators. Provisions are made at the bottom of the apparatus to seal against the escape of gas and to provide for relative expansion between the various components for separating the two bodies of particulates and the clean gas structure.

The apparatus provides for support of a subhousing solely from the top of a main housing which permits free expansion. In turn, a particulate discharge chamber housing is supported within and from the subhousing and is free to expand or contract independently. The structure of these housings defines a clean gas chamber between the main housing and the subhousing, a particulate laden hot gas chamber between the subhousing and the particulate discharge chamber housing and a particulate discharge chamber within the particulate discharge chamber housing. Both of the aforementioned subhousing and particulate discharge chamber housing, by the support from the top of the main housing, are free to expand and contract within the main housing independently of one another. The main housing may be supported by cleats from a ground supported frame or cradle in such a manner that it in turn is free to expand and contract. The separators are connected in non-load bearing and stress free relation between the subhousing and particulate discharge member to have an inlet in the particulate laden hot gas chamber and outlets in the clean gas chamber and the particulate discharge chamber.

The bottom of the apparatus is provided with expansion and sealing means in order to provide for auxiliary separation of particulates bypassing the separators at the bottom of the particulate laden hot gas chamber. Relative movement is provided for expansion and sealing against gas passage at the bottom of the main housing and the subhousing which permits removal of the aforementioned particulates that bypass the separators through an auxiliary discharge conduit.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
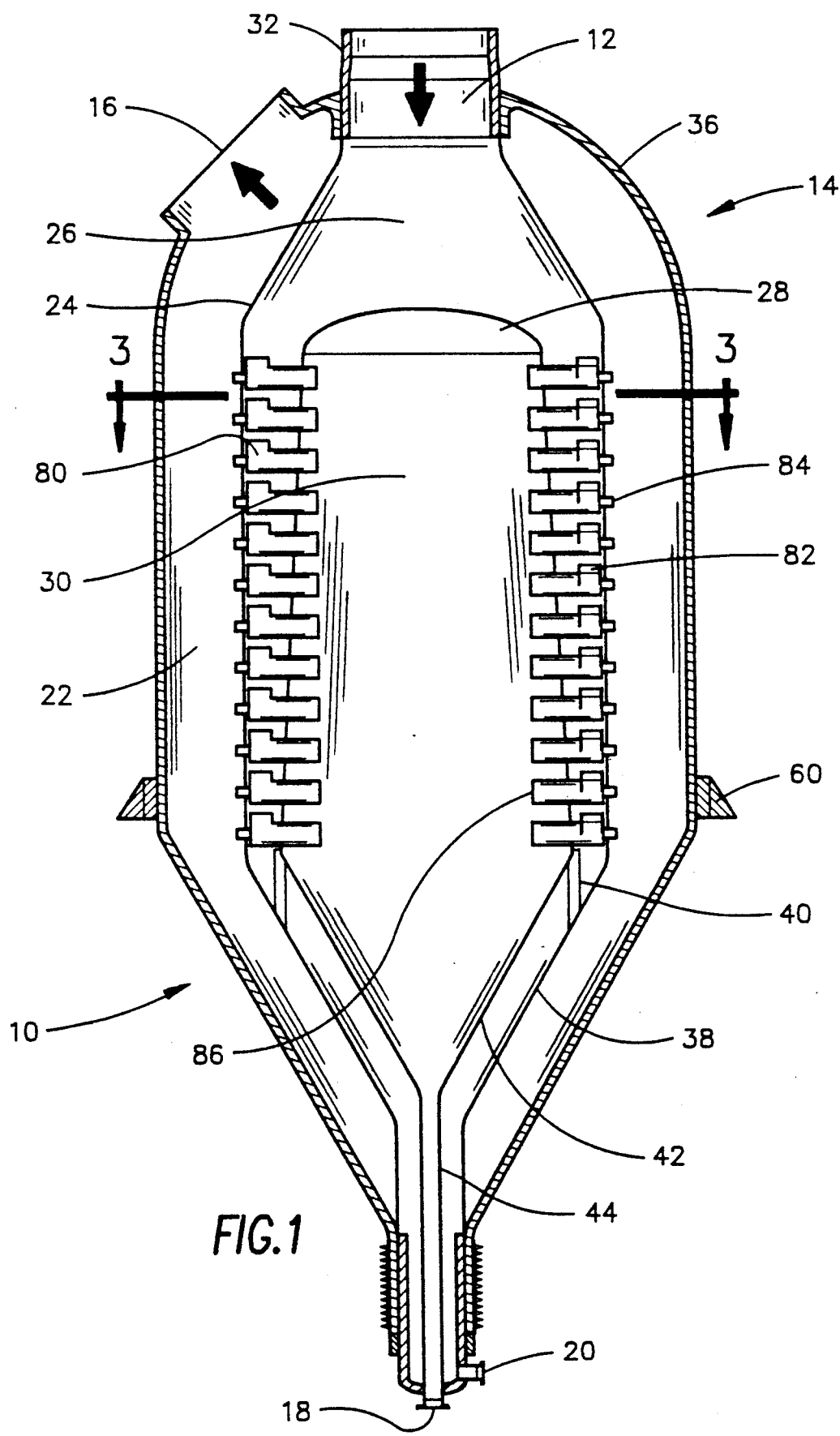
FIG. 1 is a view in vertical section along the axis of the apparatus, partly showing the components full bodied.

The particulate laden gas separator of this invention is generally referred to by the reference numeral 10 in FIG. 1. It comprises a gas inlet 12, a particulate separator housing or body 14, a clean gas discharge outlet 16, a main solids outlet 18 and an auxiliary solids outlet 20.

In most instances, where the particle laden gas is introduced at temperatures in the neighborhood of 1400° F., the wall of housing 14 will be insulated. In some installations it is customary to employ a heat exchanger at a point in advance of the introduction of this gas to the cyclone separator installation to reduce the temperature of the incoming gas to a value in the neighborhood of 600° F. In a separator designed for such use, uninsulated steel housing walls may be substituted.

In the preferred embodiment shown in FIG. 1, the interior of housing 14 is divided into a clean gas chamber 22 bounded on the outside by the walls of said housing 14 and on the interior by a subhousing 24 which also forms the boundary of a particulate laden gas chamber 26. The interior boundary of chamber 26 is defined by particle discharge chamber housing structure 28 concentrically enclosing a particle discharge chamber 30.

Subhousing 24 is supported centrally and in its entirety in load bearing relation from refractory insulated member 32 which embraces the top portion thereof. Refractory insulated member 32, in turn, is supported by arcuate top cover 36 of steel or the like constituting a part of housing 14.

In the preferred embodiment, discharge chamber housing structure 28 is shown as being supported from a conical section 38 of subhousing 24 by a cylindrical skirt member 40, although struts or the like could be substituted if desired. Skirt member 40 may, if desired, simply comprise a downward extension of housing structure 28.

Adjacent skirt member 40, the lower section of discharge chamber housing structure 28 may be formed as cone structure 42 joined at its apex to main particle discharge conduit 44 which has at its lower end the main solids outlet 18.

Figure 2:
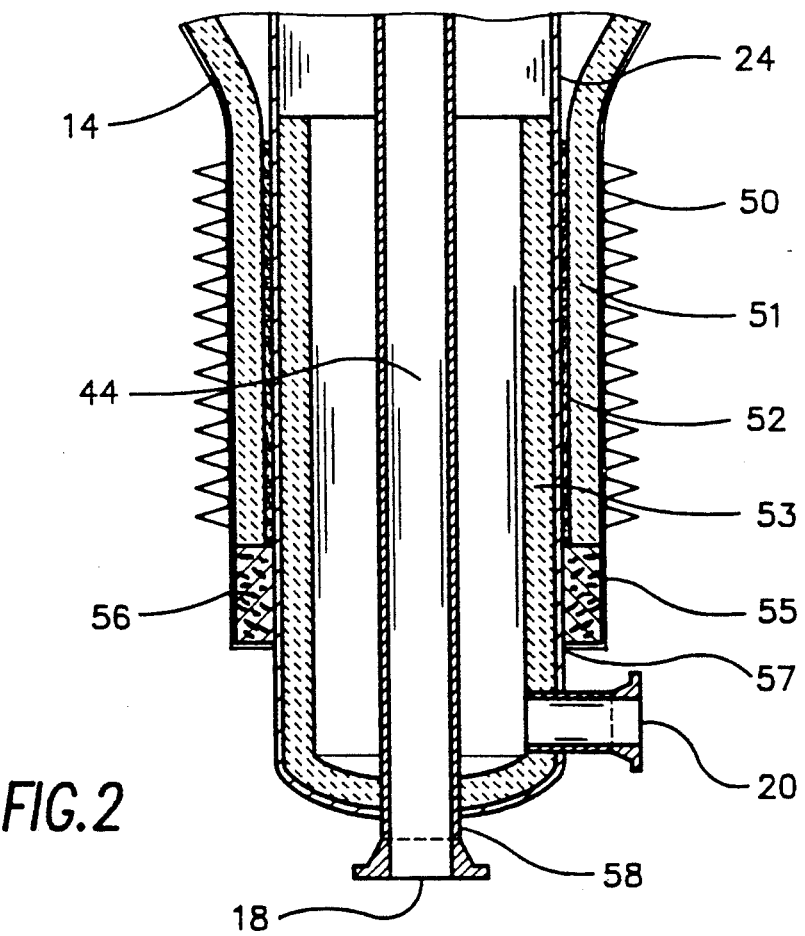
FIG. 2 is an enlarged fragmentary view similar to FIG. 1 of the bottom of the apparatus; an FIG. 3 is an enlarged view in section taken on line 3—3 of FIG. 1.

As shown schematically in FIG. 2, the lower region of housing 14 comprises an expansion joint 50, shown schematically, which compensates for longitudinal expansion. The expansion joint 50 surrounds refractory member 51 which, in turn, is separated from the lower extremity of subhousing 24 by a protective layer 52 of refractive fibrous material, or the refractory wool product known by the trade name KAYWOOL. The lower extremity of subhousing 24 extends radially inwardly from protective layer 52 and includes a refractory inner liner 53.

Expansion joint 50 as connected at its top, as by welding, to the lower extremity of housing 14. At its lower extension, expansion joint 50 is attached to a receptacle 55 containing a fibrous packing material 56 and having a joint 57 common also to subhousing 24. Discharge conduit 44 is also joined at its lower end 58 to subhousing 24. As shown in FIG. 1, the housing 14 is supported by a series of cleat members 60.

The operation of expansion joint 50 is as follows. The outer housing 14 is supported by cleats 60 so that there is downward expansion only below that region. Subhousing 24 and refractory inner layer 52 are free to slide longitudinally within refractory member 51 and housing 14, and in a given condition under typical heat conditions, this can amount to a vertical movement of 6 to 9 inches. Discharge conduit 44 will move in unison. There is a slight difference between the rate of expansion of discharge conduit 44 and that of the lower extension of subhousing 24, but this difference is not sufficient to be troublesome.

Figure 3:
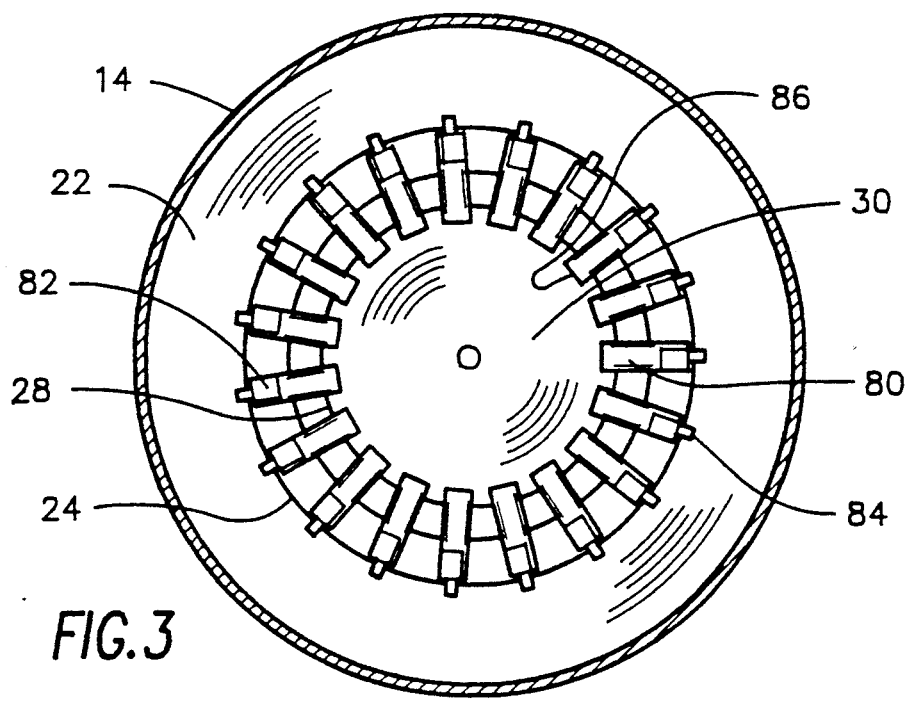

Mounted in arrays around the discharge chamber housing structure 28, as seen in FIG. 3, are several layers of separator units 80 supported between and opening into clean gas chamber 22 and particulate discharge chamber 30. As the particulate laden gas from inlet 12 flows past the individual separators units 80, it is drawn into the unit through an inlet orifice 82. Clean gas separated within the unit 80 is discharged through an orifice 84 into clean gas chamber 22. Particles separated from the gas are discharged through an orifice 86 into the particle discharge chamber 30 and descend toward the lower portion thereof where they may be withdrawn through the main solids outlet 18. The separator units 80 are connected laterally between the wall of subhousing 24 and the wall of discharge chamber housing structure 28 and load bearing stresses on units 80 are avoided.

During operation, a certain amount of the particles from the particulate laden gas will bypass the layers of separator units 80 and descend directly to the bottom of particulate laden gas chamber 26 where they may be withdrawn through auxiliary solids outlet 20. Actually, this amounts to a very important achievement which materially contributes to the efficiency of the system. The substantially downward path of the particles from gas inlet 12 past separator units 80 to auxiliary outlet 20 ensures that the entire energy applied by the gas to the particles will serve to drive many of the particles in a direct line rather than dissipating such energy in peripheral flow of the particles.

From the commercial viewpoint, where a need exists to install an improved cyclone separator system into an existing vessel configuration, for example as a replacement, the present invention offers special advantages. In many such cases the arrangement of FIG. 1 is ideal since it has been wide spread practice to feed the particulate laden vertically downward into other types of separator systems and to extract the clean gas upwardly at an angle as shown.

Various changes and modifications may be made within this invention as will be apparent to those skilled in the art. Such changes and modifications are within the scope and teaching of this invention as defined in the claims appended hereto.

What is claimed is:

1. A method for compensating for radial and longitudinal heat expansion in a particulate separator in which hot, particulate laden gas is fed downwardly through an inlet in a housing through a particulate laden gas chamber concentrically intermediate a particulate collecting chamber disposed radially inwardly therefrom and a radially outwardly disposed clean gas chamber having an outlet in the housing, said particulate laden gas chamber and clean gas chamber having a common shell wall providing for said radial and longitudinal expansion and said wall being suspended in load bearing relation solely from a top cover portion of said housing wherein provision is made for downward movement of the lower extremities of the housing defining said particulate laden gas chamber and said particulate collecting chamber, while maintaining a gas seal against outward escape of gas from said clean gas chamber the particulate laden hot gas being conducted past transversely disposed cyclone separators having an inlet in the particulate laden gas chamber, a gas outlet in the clean gas chamber and a particulate outlet in the particulate collecting chamber which separate clean gas into the clean gas chamber and pass separated particulates into the particulate collecting chamber and collecting an additional portion of the particulate bypassing the separators at the bottom portion of the particulate laden gas chamber.

2. The method of claim 1 in which a portion of the particulates are separated at a bottom portion of the particulate collecting chamber and an additional portion of the particulates is separated at a bottom portion of the particulate laden gas chamber.

3. The method of claim 1 in which particulate laden hot gas is introduced at a top of said particulate laden gas chamber and passed axially therein, said particulate laden gas is separated into particulates and clean gas and said clean gas is passed axially and upwardly to a clean gas outlet in said clean gas chamber at an upper portion thereof in countercurrent relation with the particulate laden hot gas.

4. The method of claim 3 in which said particulate laden gas is passed axially past inlets in said separators.

5. Apparatus for separating particulate material from hot gases and for compensating for radial and longitudinal expansion in a particulate separator comprising a housing having a concentrically arranged particulate laden gas chamber having an inlet at the top of the housing, a particulate collecting chamber disposed concentrically inwardly thereof and a clean gas chamber having an outlet in the housing and disposed radially concentrically outwardly, said particulate laden gas chamber and clean gas chamber having a first common shell wall providing for said radial and longitudinal expansion suspended in load bearing relation solely from a top cover portion of said housing, said particulate laden gas chamber and said particulate collecting chamber having a second common shell wall, sealing means being provided at lower extremities for preventing escape of gas outwardly from the clean gas chamber while permitting both radial and longitudinal expansion of lower parts of the particulate laden gas chamber and the particulate collecting chamber, and transversely disposed cyclone separators having an inlet in the particulate laden gas chamber, a gas outlet in the clean gas chamber and a particulate outlet in the particulate collecting chamber.

6. The apparatus of claim 5 in which a main particulate discharge opening is provided at a lower portion of said particulate collecting chamber, and an auxiliary particulate outlet is provided at a lower portion of said particulate laden chamber.

7. The apparatus of claim 5 in which a main vertically extending housing is provided, a subhousing is supported solely from a top of the main housing and a particulate collection housing is supported by said subhousing, all of said aforementioned housings being free to expand and contract independently of one another.

8. The apparatus of claim 7 in which the particulate laden gas chamber is defined by the subhousing and the particulate collection housing, the particulate collecting chamber is defined with the particulate collection housing and the clean gas chamber is defined by the main housing and the subhousing.

9. The apparatus of claim 7 in which an inlet for the particulate laden gas is provided at the top of the main housing in substantially axial communication with the particulate laden gas chamber and an outlet for the clean gas is provided at the top of the main housing for the clean gas.

10. The apparatus of claim 7 in which said main housing and said subhousing have lower portions which are disposed in sealed and sliding relation with one another to provide for relative radial and longitudinal expansion with one another.

11. The apparatus of claim 7 in which a main particulate discharge opening is provided at a lower portion of said particulate collecting chamber, and an auxiliary particulate laden chamber.

12. The apparatus of claim 7 in which said main housing, said subhousing and said particulate collecting housing have concentric downwardly tapering portions concentric with one another and concentric tubular bottom portions, the tubular portion of the particulate collecting housing defining a particulate discharge passage, the tubular portion of the particulate collecting housing and the tubular portion of the subhousing defining an auxiliary particulate passage, and the tubular portions of the subhousing and the main housing being axially moveable with respect to one another in sealed relation.

13. The apparatus of claim 7 in which said separators are supported by the subhousing and the particulate collecting housing in a manner to avoid load bearing stresses between said housing.

14. The apparatus of claim 7 in which said particulate collection housing is supported from said subhousing in free standing and spaced relation by a support member to provide for free expansion and contraction independently of said subhousing.

15. The apparatus of claim 14 in which said support member comprises upwardly extending support elements connecting substantially conical bottom portions of the subhousing and the particulate collecting housing.

16. Apparatus for separating particulate material from hot gases and for compensating for radial and longitudinal expansion in a particulate separator comprising a concentrically arranged particulate laden hot gas chamber having an inlet in the top of the housing, a particulate collecting chamber disposed concentrically inwardly thereof and a clean gas chamber having an outlet in the.housing and said chamber being disposed radially concentrically outwardly of the particulate laden hot gas chamber, a main vertically extending housing, a subhousing forming an inner wall of the clean gas chamber and an outer wall of the particulate laden gas chamber providing for said radial and longitudinal expansion supported solely from a top of the main housing and a free standing particulate collecting housing supported by said subhousing, said free standing particulate housing forming an inner wall of the particulate laden gas chamber and an outer wall of the particulate collecting chamber, all of said aforementioned housings being free to expand and contract independently of one another, and transversely disposed cyclone separators having an inlet in the particulate laden gas chamber, a gas outlet int he clean gas chamber and a particulate outlet in the particulate collecting chamber.

17. The apparatus of claim 15 in which the particulate laden gas chamber is defined by the subhousing and the particulate discharge housing, the particulate collecting chamber is defined within the particulate discharge housing and the clean gas chamber is defined by the main housing and the subhousing.

18. The apparatus of claim 16 in which an inlet for the particulate laden gas is provided at the top of the main housing in substantially axial communication with the particulate laden gas chamber and an outlet for the clean gas is provided at the top of the main housing for the clean gas.

19. The apparatus of claim 16 in which said separators are supported by the subhousing and the particulate collecting housing in a manner to avoid load bearing stresses between said housings.

20. The apparatus of claim 16 in which said main housing and said subhousing have lower portions which are disposed in sealed and sliding relation with one another to provide for relative radial and longitudinal expansion with one another.

21. The apparatus of claim 16 in which a main particulate discharge opening is provided at a lower portion of said particulate collecting chamber, and an auxiliary particulate outlet is provided at a lower portion of said particulate laden gas chamber.

22. The apparatus of claim 16 said main housing, said subhousing and said particulate collecting housing have concentric downwardly tapering portions concentric with one another and concentric tubular bottom portions, the tubular portion of the particulate collecting housing defining a particulate discharge passage, the tubular portion of the particulate collecting housing and the tubular portion of the subhousing defining an auxiliary particulate passage, and the tubular portions of the subhousing and the main housing being axially moveable with respect to one another in sealed relation.

23. The apparatus of claim 16 in which said particulate collection housing is supported from said subhousing in free standing and spaced relation by a support member to provide for free expansion and contraction independently of said subhousing.

24. The apparatus of claim 23 in which said support member comprises upwardly extending support elements connecting substantially conical bottom portions of the subhousing and the particulate collecting housing.

* * * * *

UNITED STATES PATENT AND TRADEMARK OFFICE
CERTIFICATE OF CORRECTION

PATENT NO. : 5,178,648

DATED : January 12, 1993

INVENTOR(S) : BODO KALEN AND NICHOLAS L. GIURCICH

It is certified that error appears in the above-indentified patent and that said Letters Patent is hereby corrected as shown below:

Column 5,
Claim 8, line 4, change "with" to -- within --.
Column 6,
Claim 11, line 3, after "auxiliary" add -- particulate outlet
Column 6,
is provided at a lower portion of said --.
Column 6,
Claim 13, line4, change "housing" to -- housings --.
Column 6,
Claim 17, line 1, change "15" to -- 16 --.

Signed and Sealed this

Twenty-sixth Day of October, 1993

Attest:

BRUCE LEHMAN

Attesting Officer     Commissioner of Patents and Trademarks